No. 817,964. PATENTED APR. 17, 1906.
W. P. ELMORE.
MACHINE FOR MAKING CEMENT BLOCKS AND THE LIKE.
APPLICATION FILED FEB. 27, 1905.

No. 817,964. PATENTED APR. 17, 1906.
W. P. ELMORE.
MACHINE FOR MAKING CEMENT BLOCKS AND THE LIKE.
APPLICATION FILED FEB. 27, 1905.
10 SHEETS—SHEET 2.

No. 817,964. PATENTED APR. 17, 1906.
W. P. ELMORE.
MACHINE FOR MAKING CEMENT BLOCKS AND THE LIKE.
APPLICATION FILED FEB. 27, 1905.

Witnesses:
G. V. Domarus
J. C. Lee

Inventor
Willard P. Elmore.
by A. Miller Bupfield
Atty.

No. 817,964. PATENTED APR. 17, 1906.
W. P. ELMORE.
MACHINE FOR MAKING CEMENT BLOCKS AND THE LIKE.
APPLICATION FILED FEB. 27, 1905.

No. 817,964. PATENTED APR. 17, 1906.
W. P. ELMORE.
MACHINE FOR MAKING CEMENT BLOCKS AND THE LIKE.
APPLICATION FILED FEB. 27, 1905.

No. 817,964. PATENTED APR. 17, 1906.
W. P. ELMORE.
MACHINE FOR MAKING CEMENT BLOCKS AND THE LIKE.
APPLICATION FILED FEB. 27, 1905.

Witnesses:
G. V. Domarus.
J. C. Lee

Inventor:
Willard P. Elmore,
by: A. Miller Seyfeld
Atty.

No. 817,964. PATENTED APR. 17, 1906.
W. P. ELMORE.
MACHINE FOR MAKING CEMENT BLOCKS AND THE LIKE.
APPLICATION FILED FEB. 27, 1905.

Witnesses:
G. V. Donvarus.
S. C. Lee

Inventor:
Willard P. Elmore.
by A. Miller Perfield
Atty.

No. 817,964. PATENTED APR. 17, 1906.
W. P. ELMORE.
MACHINE FOR MAKING CEMENT BLOCKS AND THE LIKE.
APPLICATION FILED FEB. 27, 1905.

Witnesses:
G. V. Domarus.
J. C. Lee

Inventor:
Willard P. Elmore.
by: A. Miller Belfield
Atty.

UNITED STATES PATENT OFFICE.

WILLARD P. ELMORE, OF ADRIAN, MICHIGAN.

MACHINE FOR MAKING CEMENT BLOCKS AND THE LIKE.

No. 817,964.     Specification of Letters Patent.     Patented April 17, 1906.

Application filed February 27, 1905. Serial No. 247,460.

*To all whom it may concern:*

Be it known that I, WILLARD P. ELMORE, a citizen of the United States, residing at Adrian, in the county of Lenawee and State of Michigan, have invented a certain new and useful Improvement in Machines for Making Cement Blocks and the Like, of which the following is a full, clear, concise, and exact description, reference being had to the accompanying drawings, forming a part of this specification.

My invention relates to machines for automatically making cement blocks and similar articles.

Prominent objects of the invention are to provide a simple, practical, and effective machine for making such articles, to arrange for the easy and ready operation and control of the same, to insure a high degree of efficiency in the use of material and operation of the machine, and to accomplish the foregoing and other desirable results in a simple and expeditious manner.

In the accompanying drawings, Fig. 3 is an end elevation.

The machine which I have shown in the drawings for carrying out my invention is provided with a bed or body portion A, from which rise standards or uprights 1, 2, 3, and 4, which largely support the operating parts of the machine. The plate 5 is mounted upon the standards or uprights 1, 2, 3, and 4, being conveniently secured thereto by bolts 6 6. This plate 5 is provided with two sets or pairs of cheek-blocks 7 7, Figs. 1, 5, and 7 to 9, inclusive, which are firmly bolted to said plates by bolts 8 8. The cheek-blocks 7 7 are provided with cheeks or flanges 9 9, each cheek-block being provided with a pair of such flanges arranged at right angles to one another. Each flange 9 is provided with a horizontally-arranged slot 11. The cheek-blocks 7 7 are arranged at the corners of a rectangle, and between them are situated two sets of slides 12 12 and 13 13, whereof the slides 12 12 are shorter than the slides 13 13 and form the ends of the rectangle, whereas the slides 13 13 form the sides thereof. The slides 12 12 and 13 13 fit closely between the blocks 7 7, thereby forming a chamber for the block of cement or other article to be formed by the machine. Said slides are arranged and adapted to slide back and forth in an inwardly and outwardly direction and as a convenient arrangement for guidance are provided with flanges 14 14 and 15 15, respectively, and these flanges are provided with bolts 16 16, carrying rollers 17 17, arranged to work in the slots 11 11 of the flanges or cheeks 9 9 of the blocks 7 7. The slides 12 12 and 13 13 are thus supported and mounted for inward and outward sliding movement, whereby the chamber which they form can be enlarged and contracted.

Figure 1:
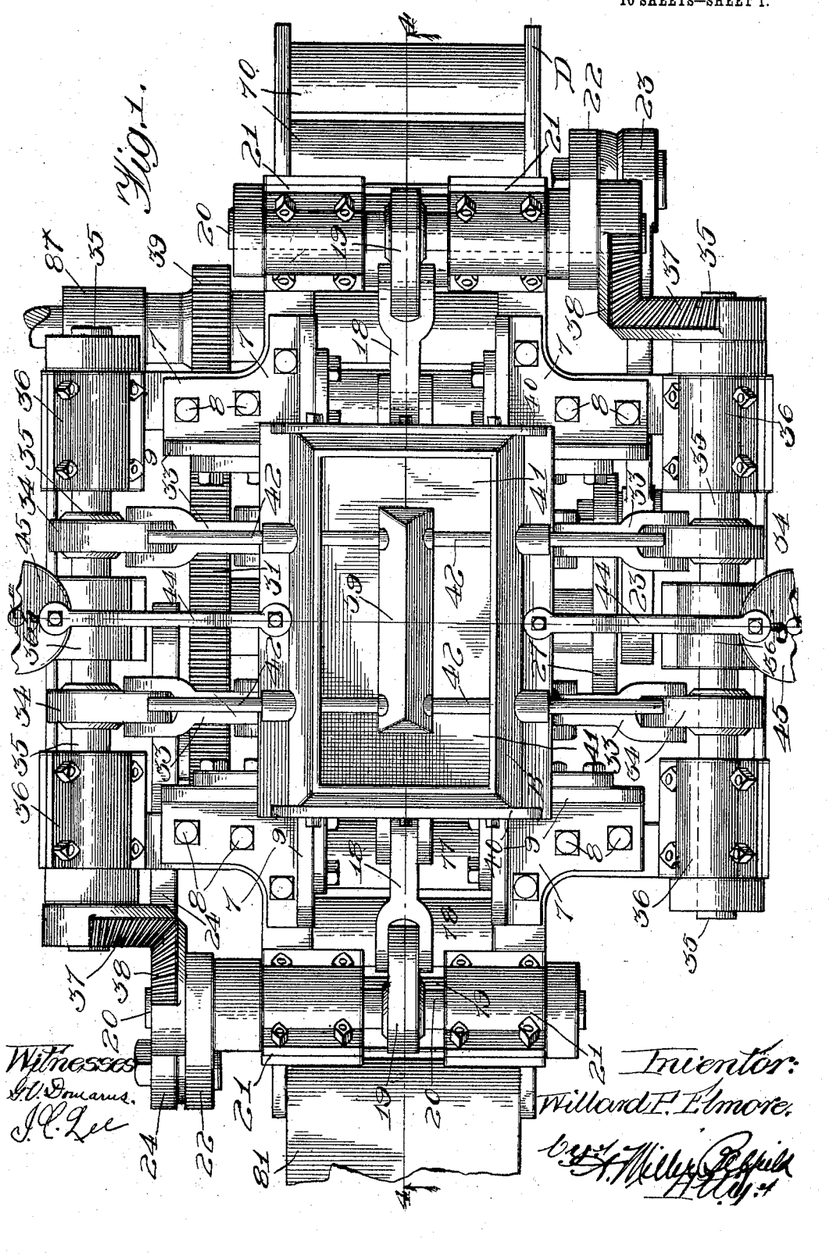
Figure 1 is a plan view of a machine for making cement blocks or similar articles embodying my invention.
Figure 2:
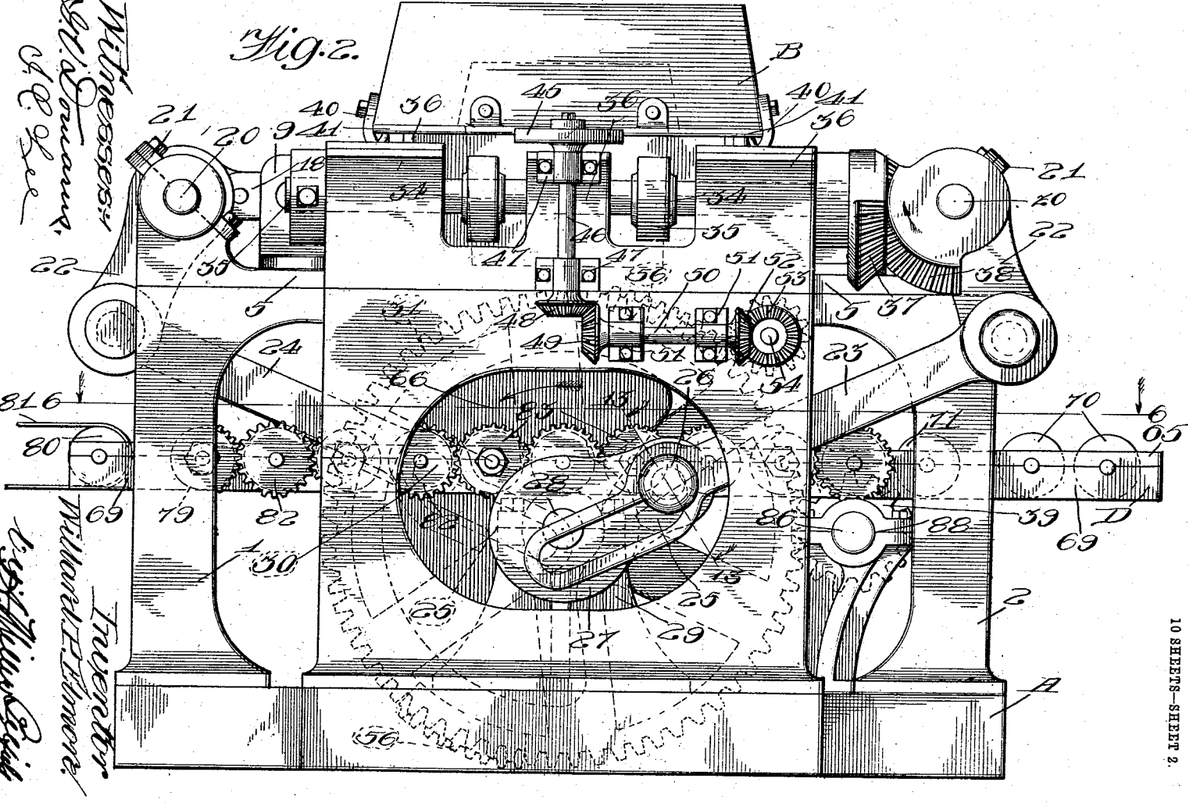
Fig. 2 is a side elevation of the same.
Figures 10, 11, 12, 13, 14:
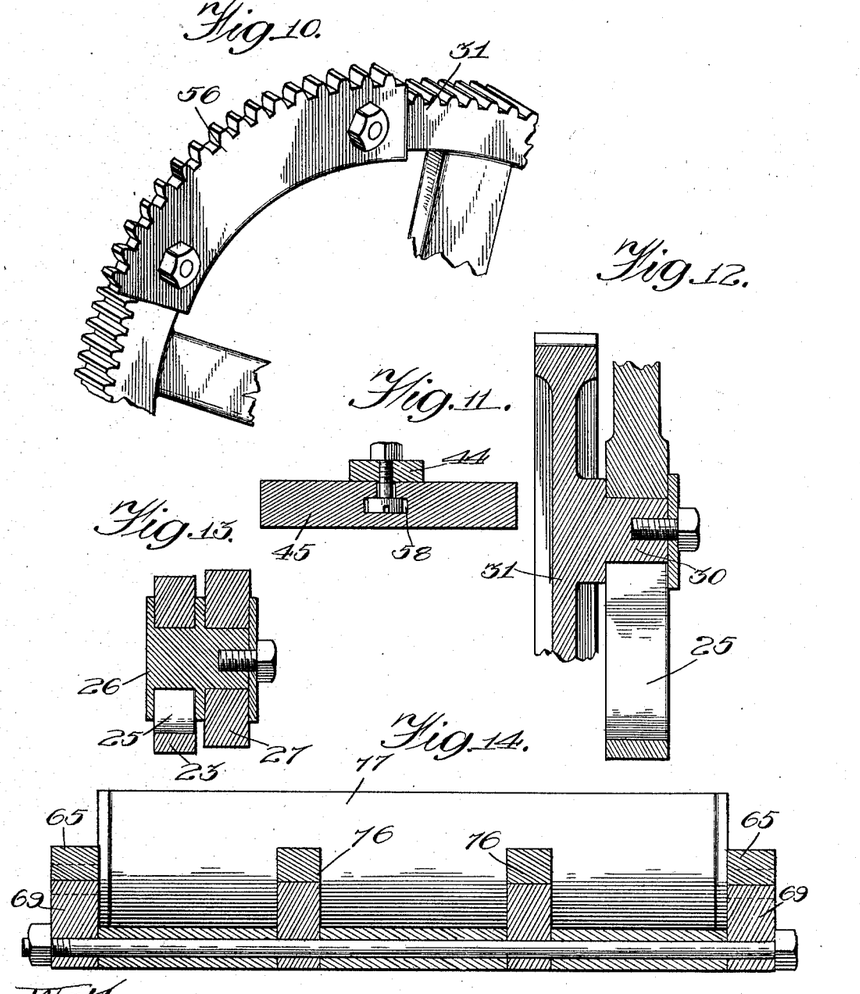

As an arrangement for actuating the slides 12 12 and 13 13, forming the sides and ends of the pressure-chamber, the end slides 12 12 are each connected with a link or yoke 18, which in turn is connected with a crank or eccentric 19, mounted on a shaft 20, supported in bearings 21 21 on the plate 5. The shafts 20 20 for the two slides 12 12 are rocked or oscillated by rocker-arms 22 22, Figs. 2 and 4, which are in turn actuated by pivotally-connected links 23 24. The links 23 24 are provided at their other ends with longitudinal slots 25 25, respectively, which have lateral recesses or indentations at their outer ends. The slot 25 of the link 23 receives and engages a pin 26, Figs. 2 and 13, on a crank 27, mounted on a central driving-shaft 28, supported by standards 29 29, secured to the base A. The slot 25 of the link 24 receives and engages a pin 30 on a gear 31, mounted on said shaft 28, as shown in Figs. 2 and 12.

The side pressure-slides 13 13 are each connected with two links 33 33, which are in turn pivotally connected with cranks or eccentrics 34 34 on rotary shafts 35 35, mounted in bearings 36 36, supported on the plate 5. The shafts 35 35 are provided with gear-segments 37 37, Figs. 1 and 2, meshing with segments 38 38 on the shafts 20. By such arrangement it will be seen that the rotation of the driving-shaft 28 will cause the links 23 24 to swing the rocker-arms 22 22, and thereby cause the eccentrics 19 19 to reciprocate the end slides 12 12 in and out and will also cause the shafts 35 35 by the interconnecting gears 37 38 to operate the eccentrics 34 34, and thereby likewise reciprocate the side slides 13 13 in and out. The in-and-out movement of the two sets of slides corresponds, all of the slides moving in and going out together, whereby the size of the chamber formed by said slides is contracted or expanded. The presence of the slots 25 25 in the links 23 24 causes the slides to remain stationary in their outward positions for a time, this being due to the fact that the pins working in such slots become disengaged therefrom during their back strokes and work in the slots without actuating the links 23 and 24 for the length of said slots. During this movement the slides are in their outward positions and remain so until the pins in said slots can reach the outer ends thereof and enter and engage with the lateral extensions of said slots. Thus it will be seen that the sides and ends of the chamber formed by the slides 12 and 13 are simultaneously moved in and then out and then held in an outward position for a time and then moved in and out again and so on.

A hopper B is arranged and supported above the compression-chamber formed by the reciprocating slides 12 and 13. This hopper is conveniently made tapering toward its upper end and is secured to and supported by struts or arms 40 40, Figs. 2, 3, and 4. Between the hopper B and the pressure-chamber below the same is a pair of slides 41 41, which are arranged to slide back and forth so as to form a floor for the hopper when in their inward positions and to open the same to the pressure or article chamber when retracted. These slides 41 41 are mounted for sliding movement upon a pair of rods 42 42, which extend crosswise of the hopper and project from the sides thereof and are supported thereby. The slides 41 41 are reciprocated by links or rods 44 44, which are actuated by disks 45 45, carried by shafts 46 46, Fig. 2, mounted in bearings 47 47, secured to the plate 5. The shafts 46 46 are intermittently turned by meshing gears 48 48 and 49 49, the former on the shafts 46 46 and the latter on horizontally-arranged shafts 50 50, carried by bearings 51 51 on the standards 3 and 4. The shafts 50 50 are driven by intermeshing gears 52 52 and 53 53, the latter being at the ends of a horizontally-disposed shaft 54, extending from side to side of the machine, as shown in Fig. 3, and supported by the standards 3 and 4. This shaft 54 carries a gear-wheel 55, which meshes with segmental gears 56 56 on the large gear-wheel 31, Figs. 2 and 10. Thus as the gear 31 rotates one of the segments 56 turns the gear 55 one half a revolution, and this has the effect of turning the shafts 50 50 and 46 46 one half a revolution each, and thereby causing the links 44 44 to withdraw the slides 41 41, whereas the other gear-segment 56 rotates the shaft 54 the other half of a revolution, thereby causing the slides 41 41 to be moved into their inward positions. In this way the slides are reciprocated and held in each position substantially equal lengths of time. The arrangement is such that the slides are out when the pressure-walls are out and begin to move in when the pressure-walls have moved part way in. The gates or slides then move quickly in and come together before the pressure-walls have completed their forward movement. The latter then finish their inward strokes. The disks 45 45 are constructed with grooves or channels 58, Fig. 11, by which the links 44 44 can be adjusted to vary the throw of the gates or slides 41 41.

A core 59 is arranged in the center of the pressure-chamber to form a recess or cavity of any desired kind in the center of the cement block or other article. This core is carried and supported by the rods 42 42, Fig. 5, which hold it securely in position.

Figure 4:
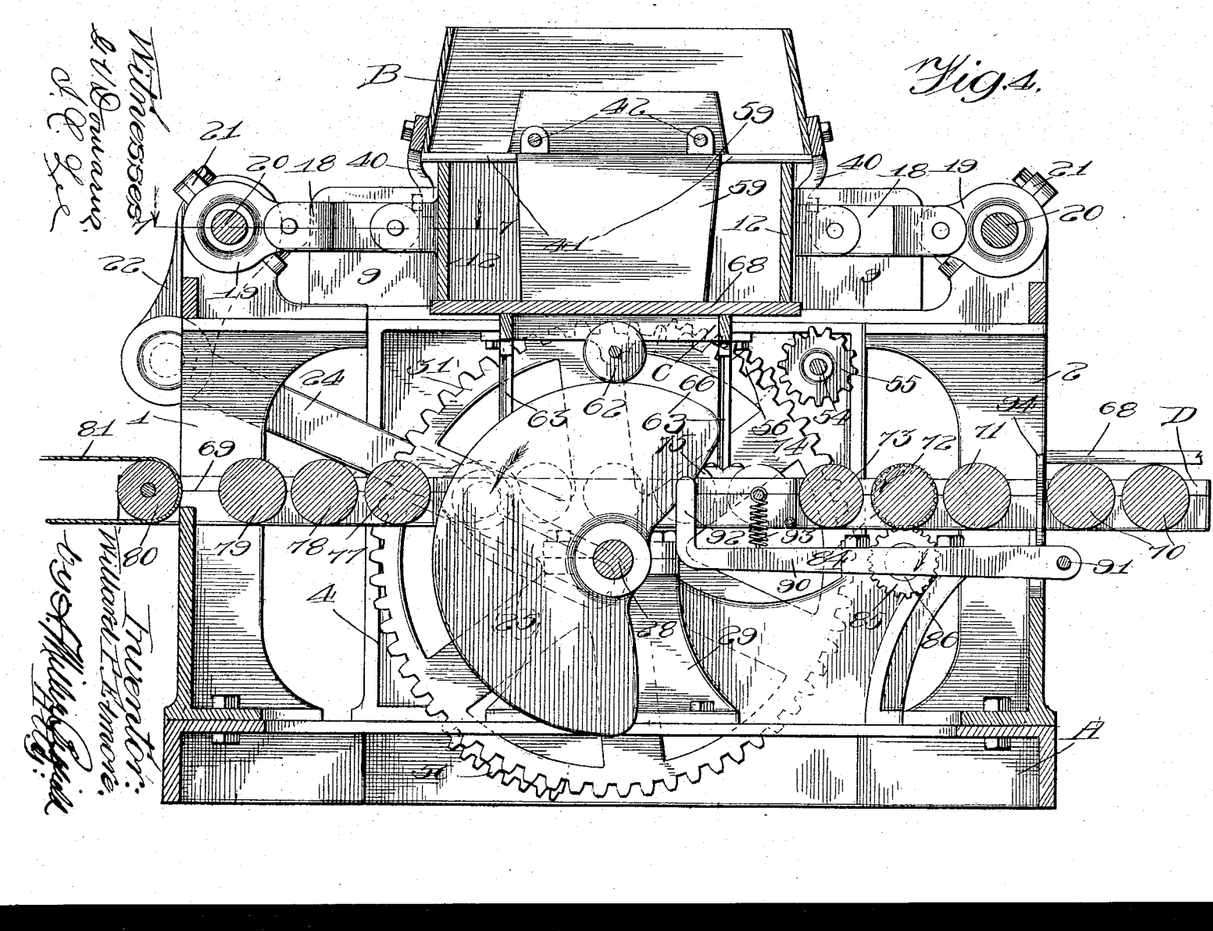
Fig. 4 is a longitudinal section taken on line 4 4 in Fig. 1.
Figure 5:
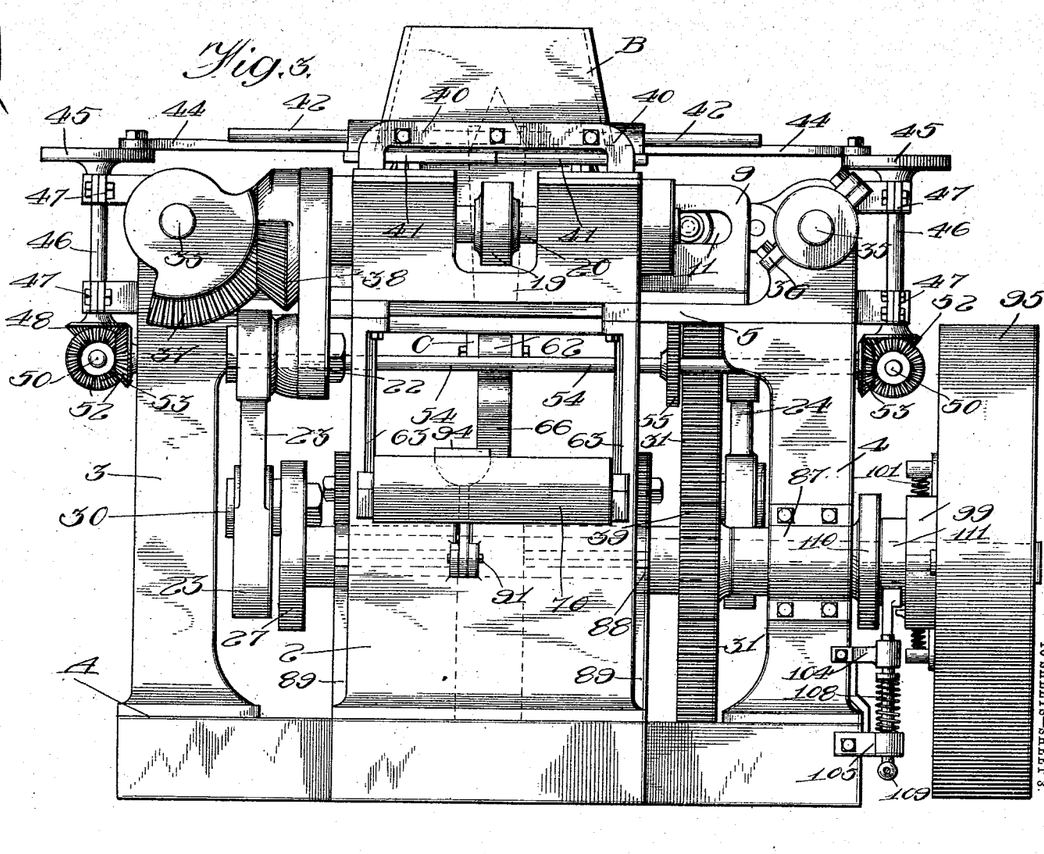
Fig. 5 is a transverse section taken on line 5 5 in Fig. 1.
Figures 18, 19, 20, 21:
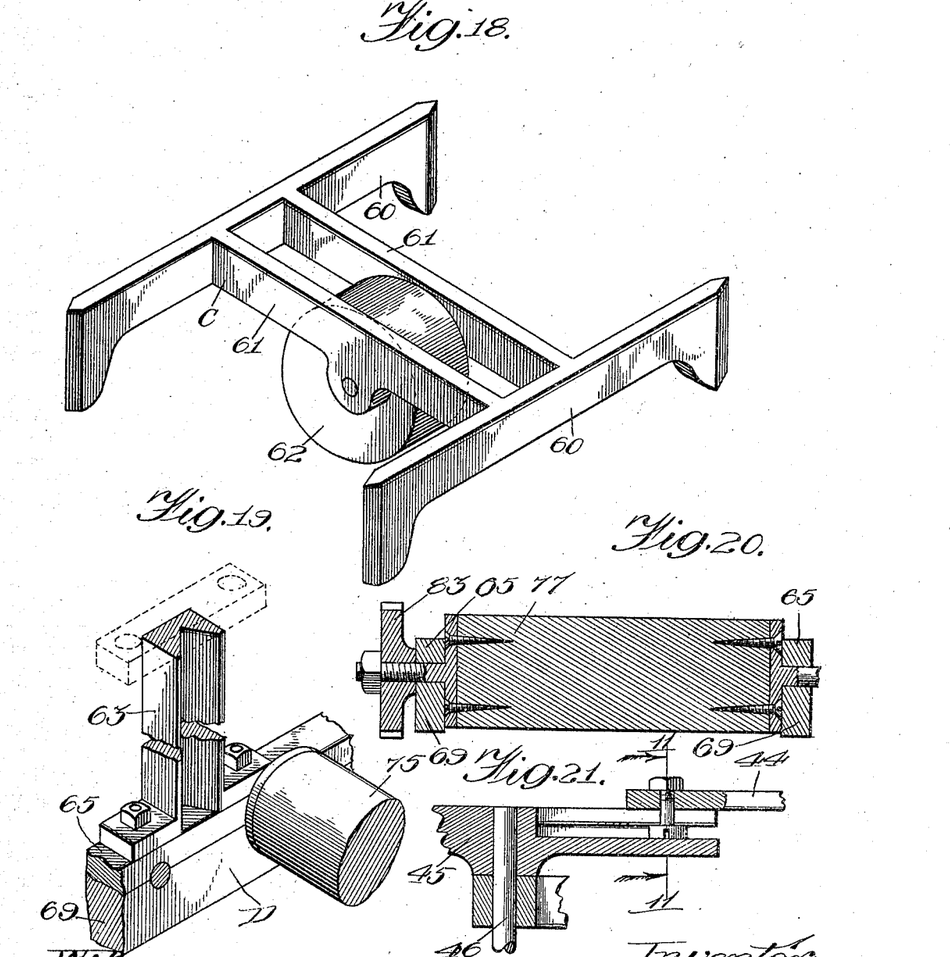

In the center of the machine and below the expansible and contractible chamber above described is a vertically-reciprocating carriage C, Figs. 4 and 18. This carriage conveniently consists of side pieces 60 60 and cross-pieces 61 61 and is provided with a roller 62, suspended from the cross-pieces 61 61. This carriage is arranged to work up and down in a guide-frame comprising vertical uprights 63 63, secured at their upper ends to the plate 5 and at their lower ends to horizontal strips 65 65. The ends of the side pieces 60 60 are desirably pointed and the uprights 63 63 correspondingly grooved to insure the proper guidance and travel of said carriage. The carriage is raised and lowered by a rotary cam 66, mounted on the central shaft 28, as shown in Figs. 4 and 5. This cam 66 is arranged to elevate and lower the carriage C by acting upon the wheel or roller 62, which travels on said cam, the carriage being held in its upper position for a time and in its lowered position for a time. The shaft 28 is driven by the gear 31, meshing with a pinion 39 on the main driving-shaft 86. The arrangement is such that the carriage is elevated before the walls of the pressure-chamber begin their inward movement, and it remains elevated during such inward movement, beginning to descend shortly after the pressure-chamber walls begin to retract or move outwardly. A pallet-board 68 is supported and carried by the carriage C.

Figure 6:
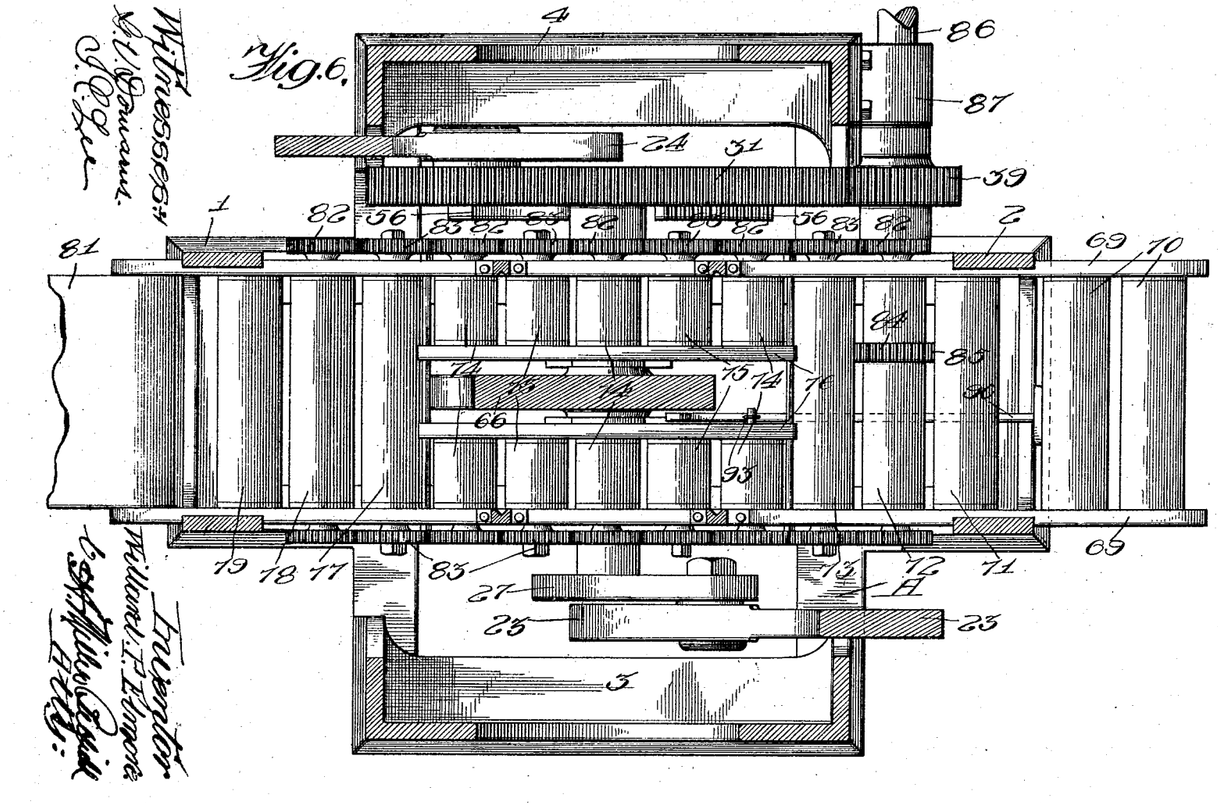
Fig. 6 is a horizontal section taken on line 6 6 in Fig. 2.
Figure 7:
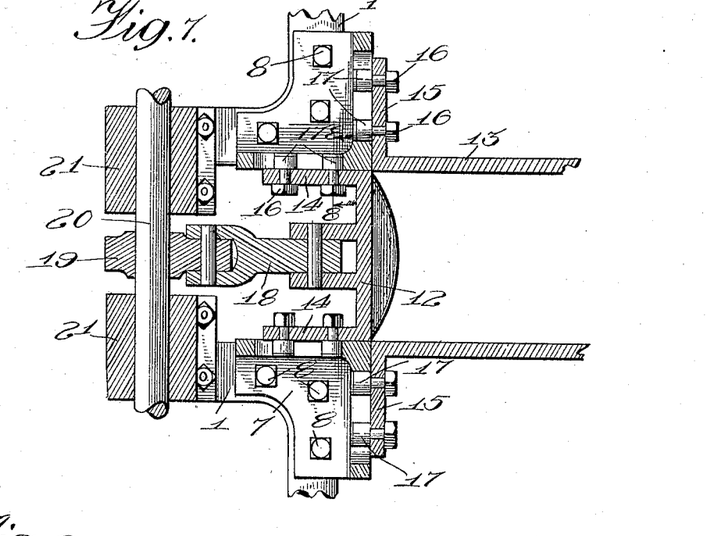
Fig. 7 is a fragmental section taken on line 7 7 in Fig. 4.
Figure 8:
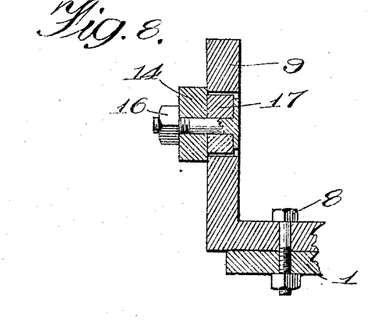
Figs. 8 to 21, inclusive, are views of details of construction.
Figure 9:
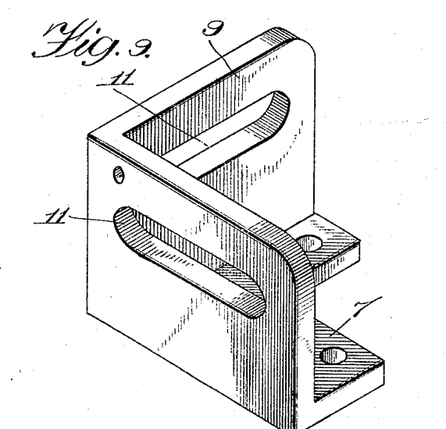

Extending longitudinally through the middle of the body of the machine is a roller-frame D, which conveniently consists of side strips 69 69, supported by the standards 1 and 2, Fig. 14, and provided with upper strips 65 65. At the right-hand end of this frame, Figs. 2 and 6, is mounted a pair of idle rollers 70 70. Upon these is normally supported another pallet-board 68. To the left of the rollers 70 70 are three rollers 71, 72, and 73. Next are five pairs of short rollers 74 74 and 75 75, whose inner ends are mounted in short frame-pieces 76 76, the rollers in the middle of the frame being thus divided to accommodate the cam 66. Beyond the rollers 74 and 75 are three more rollers 77, 78, and 79 and beyond these a belt-roller 80, provided with a belt 81. The rollers 71 to 78, inclusive, are provided with gear-wheels 82 82 and 83 83, arranged to intermesh with one another. The gears 82 82 are fast on the rollers to which they are connected; but the gears 83 83 are loose, whereby the rollers 72, 74, 74, and 78 are positively driven in the same direction, whereas the rollers 73, 75, 75, and 77 are idle. The roller 72 is provided with a gear-wheel 84, which meshes with a driving-gear 85, mounted on a driving-shaft 86, which is the main driving-shaft of the machine and is supported in bearings 87 88, the former on the standard 4 and the latter on standards 89 89. Thus each alternate roller, beginning with the roller 72, is positively driven all in the same direction, while the intermediate rollers are loose or idle.

A trigger 90, pivoted at its end at 91, is arranged longitudinally of the machine and has its inner end 92 bent upwardly, as shown in Fig. 4. This trigger is normally held in an upward position by a spring 93. It carries a stop 94, which is located between the rollers 70 and 71 and is adapted to interrupt the movement of the pallet-board 68 along the rollers when in its upward position and to permit such movement when lowered. The bent end 92 of the lever or trigger 90 is in position to be actuated by the pallet-board 68, carried by the carriage C, when said carriage is lowered.

Figures 15, 16, 17:
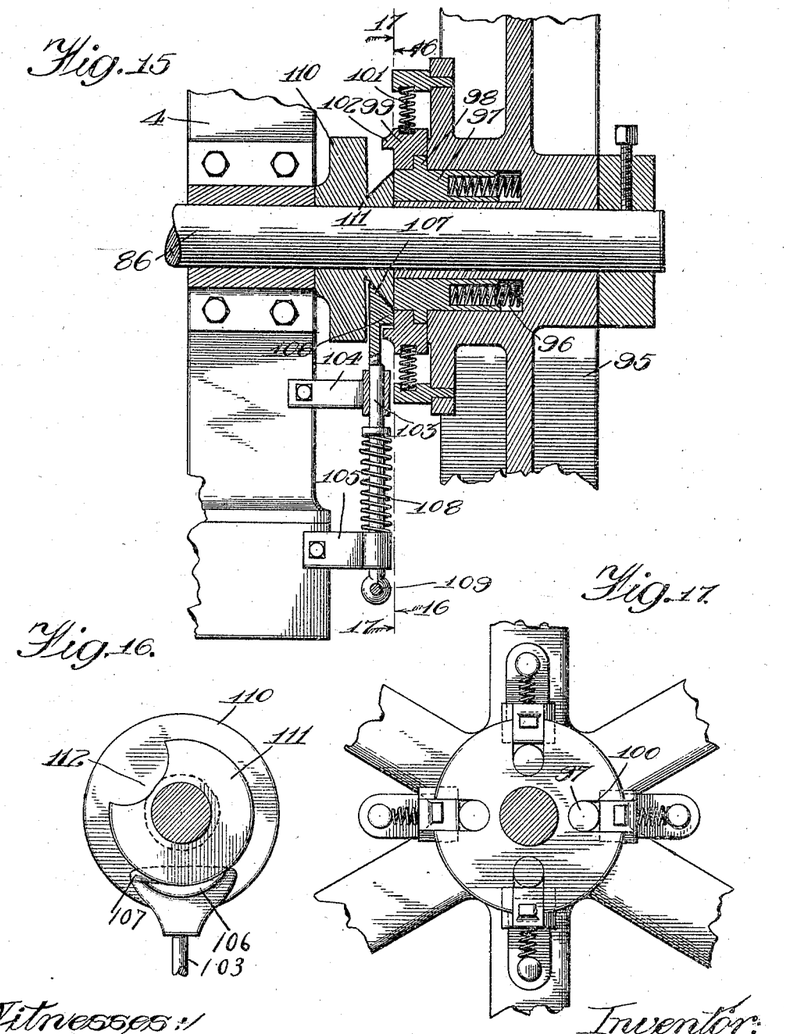

As a clutch arrangement for readily starting and stopping the machine the driving-shaft 86 is provided with a loose pulley 95, Fig. 15. The hub of this pulley is provided with four sockets 96 96, in which are arranged spring-actuated spindles 97 97, each of which is constructed with a lateral projection 98, adapted to fit against the outer side of the wheel-hub. A corresponding number of slides 99 are mounted in radial slots 100 and arranged to move in a direction toward and away from the axis of rotation of the wheel. These slides are held normally in their inner position by springs 101 and are provided with ears or projections 102. A slide rod or trip 103 is mounted to slide vertically in bearings 104 105 on the standard 4. The upper end of this rod or trip 103 is provided with a lug or projection 106, adapted to engage the ears 102 on the slides 99. The inner edge of the projection 106 is beveled, as at 107. A spring 108 normally holds the rod 103 in an elevated position. An operating-rod 109 is connected with the lower end of the rod 103 and arranged for actuation by foot or hand in any desired way. A driving-collar 110 is mounted on the shaft 86 between the wheel 95 and standard 4 and has a hub portion 111, provided with a peripheral recess 112, adapted to receive one of the pins or spindles 97 97 should the same be projected. Thus it will be seen that when the pins 97 97 are all in their inward positions the pulley 95 will run loose on the shaft 86. When, however, the rod 109 is actuated so as to depress the trip 103, the latter engages one of the slides 99 and draws the same downwardly, thereby releasing the pin 97, associated with said slide, and permitting the same to be projected outwardly, so that it enters the recess 112 in the collar 110. This causes an engagement between the pulley 99 and collar 110, and the latter being fast on the shaft 86 causes the same to rotate and the machine therefore to be driven. When it is desired to stop the machine, the rod 109 is released, so as to permit the slide-rod 103 to rise, whereupon the inclined surface 107 thereof causes the pin 97, which has been projected, to be returned to its socket 96, thereby withdrawing said pin from the recess 112 and disengaging the pulley 95 therefrom and from the shaft 86.

The operation of the device is as follows: The machine is started by actuating the operating-rod 109, so as to throw the clutch into connection with the main driving-shaft. The material from which the cement blocks or other articles are to be made is properly prepared and then fed into the hopper B. This material can be of any desired composition, such as a mixture of cement, sand, and water. In this prepared form it is fed continuously into the hopper. The gates or slides 41 41, being in their inner or closed position, form a temporary floor for the prepared mixture, so that the same is accumulated in the hopper, and then these gates are actuated so as to withdraw them, precipitating a quantity of the mixture into the pressure-chamber formed by the movable pressure-walls 12 12 and 13 13. At this time the pressure-chamber is in an enlarged condition, with its walls traveling inward. At this time also the vertically-reciprocable carriage C is in its uppermost position, holding a pallet-board 68 below and against the walls of said chamber, so as to form a closed box-like structure for the article to be made. The material fills the pressure-chamber and the walls thereof continue their inward movement, and as they move inwardly the gates 41 41 are actuated and closed before the pressure-chamber walls finish their inward movement. This movement is then completed, compressing the material compactly into the closed chamber. The pressure-walls then start outwardly, and then the reciprocable carriage C descends, carrying the article with it upon the pallet-board 68. When the pallet-board strikes the rollers 74 75, the carriage continues its downward movement somewhat further, thereby allowing the pallet-board, with the cement block or other article upon it, to rest upon said rollers, and the latter by their rotary movement advance the same to one side, (to the left, referring to Figs. 4 and 6,) so that it moves over the rollers 74, 75, 77, 78, and 79 and onto the belt 81, by which it is transferred to some suitable part of the building. When the carriage C has arrived nearly to the lower end of its movement, it actuates and trips the lever 90, thereby withdrawing the stop 94 and permitting another pallet-board 68 to be advanced over the rollers 70, 70, 71, 72, and 73 into position upon said carriage C. The latter then rises, assuming its position below the pressure-chamber, the pressure-walls having in the meantime moved to their outward position. The gates 41 41 are then moved out, the material from the hopper again deposited in the pressure-chamber, and the operation repeated as before.

It will be understood that changes and modifications can be made in the machine herein set forth without departing from the spirit of my invention.

What I claim as my invention is—

1. The combination with a pressure-chamber, comprising laterally-movable side and end walls, means for moving the same simultaneously in and out, a top comprising separable portions, a bottom, and a vertically-reciprocating carriage for carrying the same, means for shifting the separable portions of said top, means for moving said side and end walls in and out, and means for reciprocating said carriage, said mechanism being arranged to begin the downward reciprocation of the carriage shortly after the pressure-walls begin to move outwardly.

2. The combination of a pressure-chamber comprising laterally-movable side and end walls, a top comprising separable portions, a reciprocating carriage for carrying a removable bottom for the pressure-chamber, means for raising and lowering said carriage, and means for transferring the bottom from the machine.

3. The combination with a pressure-chamber, of means for shifting the walls thereof for expanding and contracting the chamber, a reciprocating carriage below said chamber for carrying a removable bottom therefor, a rotary cam for raising and lowering said carriage, and power-rollers for transferring the removable bottom from said carriage.

4. The combination of a pressure-chamber, comprising shiftable walls for expanding and contracting the chamber, and mechanism for shifting said walls, comprising links 18 and rock-shafts 20 having cranks 19 engaging the links 18, rocker-arms 22 on the shafts 20, links 23, 23 pivotally connected with the rocker-arms 22, 22, and cranks for actuating said links.

5. The combination with the bodily-movable side and end walls for a pressure-chamber, of mechanism for actuating the same, comprising links 18 and 23, rock-shafts 20 and 35 having cranks 19 and 34 respectively connecting with the links 18 and 33, gearing between said shafts 20 and 35, links 23 and 24 carried by the shafts 20, and cranks for actuating said links.

6. The combination with the bodily-movable side and end walls for a pressure-chamber, of mechanism for actuating the same comprising links 18 and 33, rock-shafts 20 and 35 having cranks 19 and 34 respectively connecting with the links 18 and 33, gearing between said shafts 20 and 35, links 23 and 24 carried by the shafts 20, and cranks for actuating said links, said links being provided with slots having lateral recesses at one end, whereby the pressure-walls are held a predetermined length of time at their inward and outward positions.

7. The combination of slides 12 and 13 forming the end and side walls respectively of a pressure-chamber, said slides being provided with lateral flanges 14, 14 and 15, 15 respectively, cheek-blocks 7, 7, provided with slots 11, 11, and rollers 17, 17 on the slides 12 and 13, adapted to fit and travel in said slots 11, 11.

8. The combination with a pressure-chamber comprising shiftable pressure-walls 12, 12 and 13, 13, of mechanism for shifting said walls in and out, comprising rock-shafts gear-connected together and provided with crank connections with said pressure-walls, rocker-arms 22, 22 for actuating said gear-connected rock-shafts, links 23, 24 connected with said rocker-arms 22, 22, said links being provided with slots 25, 25, crank-pins adapted to work in said slots 25, 25, a rotary cam 66 carried by the shaft carrying said crank-pins, and a reciprocating carriage arranged to be raised and lowered by said rotary cam.

9. The combination with a pressure-chamber, of a top therefor comprising separable portions 41, 41, and mechanism for shifting said portions, comprising links or rods 44, 44, rotary disks 45, 45 for actuating said rods, and means for actuating said disks.

10. The combination with the slides 41, 41, of links or rods 44, 44 connected therewith, rotary disks 45, 45 with which said rods 44, 44 are connected, rotary shafts 46, 46, carrying the disks 45, 45, and gearing for rotating the shafts 46, 46.

11. The combination with the slides 41, 41, of links or rods 44, 44 connected therewith, rotary disks 45, 45 with which said rods 44, 44 are connected, rotary shafts 46, 46 carrying the disks 45, 45, rotary shafts 50, 50 gear-connected with the shafts 46, 46, a rotary shaft 54 gear-connected with the shafts 50, 50 and provided with a gear 55, and gear-segments 56, 56 located on opposite sides of a rotary wheel, whereby the shaft 54 is rotated at intervals by the separated segments 56, 56 to shift the slides 41, 41 in and out.

12. The combination with the shiftable slides 41, 41, of mechanism for shifting the same back and forth, comprising separated gear-segments 56, 56 carried by a rotary wheel and coöperating with a gear controlling said slides 41, 41.

13. The combination of a pressure-chamber comprising inwardly and outwardly movable pressure-walls, mechanism for shifting said walls, comprising rock-shafts gear-connected with one another and link-connected with said walls, crank connections for actuating said rock-shafts, said crank connections being actuated by a rotary driving-shaft provided with cranks, slides 41, 41, and means for shifting the same, comprising rotary shafts link-connected with said slides, and separated segments 56, 56 carried by said rotary driving-shafts, coöperating with a gear controlling said slides 41, 41.

14. The combination with a pressure-chamber having inwardly and outwardly movable pressure-walls, of mechanism for shifting said walls, comprising rock-shafts connected with said walls, means for rocking said shafts, slides forming gates for a cover for said pressure-chamber, means for shifting said gates, comprising links and rotary shafts for actuating the same, separated gear-segments, and a coöperating gear for intermittently turning said rotary shafts, said separated segments being carried by a rotary driving-shaft, a reciprocating carriage adapted to carry a bottom for said pressure-chamber, and a rotary cam carried by said rotary power-shaft and adapted to reciprocate said carriage vertically.

15. The combination with a pressure-chamber, of a reciprocating carriage carrying a bottom for said chamber, a rotary cam 66 for actuating said carriage, said cam being constructed with a cut-away portion, whereby the carriage is raised and lowered by the cam.

16. The combination with a pressure-chamber and reciprocating carriage carrying the bottom of said chamber, of vertical guideways for said carriage, said carriage being constructed with side pieces 60, 60 whose ends are adapted to fit in said guideways, and with cross-pieces 61, 61 connecting said side pieces.

17. A reciprocating carriage comprising side pieces 60, 60 and cross-pieces 61, 61, and a roller 62 arranged between and hung from the cross-pieces 61, 61, in combination with a pressure-chamber and a bottom therefor carried by said carriage.

18. The combination with the reciprocating carriage C, of a series of rollers located near the lower end of the path of travel of said carriage, and means for driving said rollers, in combination with a pressure-chamber having its bottom carried by said carriage.

19. The combination with a pressure-chamber and a reciprocating carriage having a platform for carrying a pallet-board adapted to form the bottom of said chamber, of a series of rollers adapted to receive the pallet-board from said carriage, and means for driving said rollers.

20. The combination with a pressure-chamber and means for contracting the same, of means for raising and lowering the bottom of said chamber, a series of rollers, and means for driving the alternate rollers in the same direction.

21. The combination with a pressure-chamber for the article and means for contracting the same, of means for raising and lowering the bottom thereof, a series of rollers located to receive said bottom, gearing for driving said rollers, said gearing being loosely connected with alternate rollers, whereby such rollers will be idle and the intervening rollers positively driven all in the same direction.

22. The combination with a pressure-chamber and means for contracting the same, of means for raising and lowering the bottom thereof, a series of rollers located to receive the bottom when lowered, the alternate rollers being provided with rigidly-attached gear-wheels and intermediate rollers being provided with loosely-mounted gear-wheels, and means for driving said gear-wheels.

23. The combination with a pressure-chamber and means for contracting the same, of a reciprocating carriage for carrying the bottom of said chamber, a cam 66 for raising and lowering said carriage, and a roller-frame comprising long rollers at its opposite ends and divided rollers between its ends, said divided rollers being divided to accommodate the cam 66.

24. A roller-frame comprising side strips and cross-strips between which rollers are mounted and intermediate longitudinally-extending strips 76, 76 between said side strips, and short rollers mounted between said intermediate and said side strips, in combination with a pressure-chamber and means for contracting the same, and mechanism for lowering the bottom of said chamber to said rollers.

25. The combination of a pressure-chamber and means for contracting the same, of means for lowering the bottom of said chamber, a roller-frame comprising side strips 69, 69 and cross-strips extending between the same, long rollers extending between said side strips at the opposite ends of said frame, intermediate longitudinally-extending strips 76, 76, short rollers between said intermediate strips and said side strips, a gear 84 on one of said long rollers, and intermeshing gears 82, 83 on said long and short rollers, each alternate gear being loose on its roller.

26. The combination with a pressure-chamber and means for contracting the same, of a reciprocating carriage adapted to carry a pallet-board forming the bottom of said chamber, means for removing said pallet-board from said carriage, and mechanism actuated by said carriage for placing another board thereon.

27. The combination with a pressure-chamber and means for contracting the same, of a reciprocating carriage located below said chamber, means for reciprocating said carriage, a series of rollers located at the lower end of the path of reciprocation of said carriage, mechanism for driving said rollers, and a lever arranged to be actuated by said carriage and provided with a stop to intercept a pallet-board traveling on said rollers.

28. The combination with a pressure-chamber and means for contracting the same, of a reciprocating carriage arranged below the pressure-chamber for carrying a pallet-board forming the bottom of said chamber, a series of rollers located below said chamber to receive the pallet-board from said carriage and transfer the same to one side, and a pivoted lever 90 having an upturned end adapted to be actuated by said carriage and provided with a stop 94 located between two of said rollers.

29. The combination with a pressure-chamber and gates 41, 41 for closing the top thereof, of rods 42, 42 on which said gates are mounted for sliding movement.

30. The combination with the slides 41, 41 of rods 42, 42 on which said slides are mounted for sliding movement, a hopper carrying said rods, and means for supporting said hopper.

31. The combination with the slides 41, 41, of rods 42, 42 on which said slides are mounted for sliding movement, a hopper carrying said rods, and struts 40, 40 for supporting said hopper.

32. A machine of the class specified, comprising a hopper for the material from which the article is to be made, a pressure-chamber located below said hopper and provided with inwardly and outwardly movable pressure-walls, means for shifting said walls, comprising rock-shafts link-connected with said walls and gear-connected with one another, and links and rocker-arms for rocking said rock-shaft, a rotary power-shaft provided with crank-pins for actuating said links, gates arranged for sliding movement between said hopper and pressure-chamber, together with mechanism for actuating said gates consisting of rotary disks link-connected with the gates, and a rotary shaft gear-connected with said disk-shafts and provided with a gear-wheel 55, a pair of separated gear-segments on a large gear mounted on said rotary shaft, said segments being adapted to turn said gear 55 at intervals to cause the same to shift said gates in and out, a reciprocating carriage adapted to carry a pallet-board to form a bottom for said pressure-chamber, a rotary cam mounted on said rotary power-shaft and cooperating with a roller on said reciprocating carriage for raising and lowering the latter, a series of rollers together with mechanism for driving alternate rollers in the same direction, said rollers being arranged to receive the pallet-board from said carriage and transfer the same from the carriage, a pivoted lever 90 arranged to be actuated by the carriage when the same is near the bottom of its downward movement, said lever being provided with a stop 94 interposed between two of said rollers, and a main driving-shaft gear-connected with said rollers and having a power-gear for driving said large gear on said driving-shaft.

In witness whereof I hereunto subscribe my name this 23d day of February, A. D. 1905.

WILLARD P. ELMORE.

Witnesses:
 ANNA NOONE,
 J. N. SAMPSON.